3,311,622
SUBSTITUTED PHOSPHONITRILIC TRIMERS
Stephen P. Joffre, Cedar Grove, N.J., assignor to Shulton, Inc., Clifton, N.J., a corporation of New Jersey
No Drawing. Filed May 17, 1961, Ser. No. 110,665
5 Claims. (Cl. 260—246)

This invention relates to a new class of compounds useful as herbicides for the postemergence killing of undesirable grasses and weeds. More particularly it relates to certain novel substituted phosphonitrilic trimers and to the use of these materials for inhibiting the postemergence growth of certain plants. The novel herbicidal compounds of the present invention are further characterized by high phosphorus and nitrogen values, and may be detoxified by soil bacteria to release nitrogen and phosphorus in the form of useful fertilizing elements.

While the several different herbicidal compounds of the present invention exhibit varying degrees of selectivity and effectiveness toward inhibiting the growth of undesirable plants, they appear to be most effective on broad leaf grasses and weeds.

The novel compounds of the present invention may be described as substituted phosphonitrilic trimers of the general formula $(P_3N_3)Cl_mY_n$, where $(P_3N_3)$ designates the phosphonitrile trimeric ring:

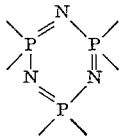

$m$ is an integer from 0 to 5, $n$ is an integer from 1 to 6 and the sum of $m$ and $n$ is equal to 6, and Y is a radical containing up to six carbon atoms, of the type: —NHR, —NR$_2$, —R' and —SR'', where R is an aryl, alkyl, or alkyl-alkoxy group or an alkenyl group with one unsaturation, or an alkynyl group with one unsaturation; R' is an —N containing heterocyclic or a —N and oxygen-containing heterocyclic radical, and R'' is an aryl or alkyl radical.

The herbicidally active compounds are synthesized from phosphonitrilic chloride trimer, $(P_3N_3)Cl_6$, with the chlorine atoms attached to the phosphorus atoms of the ring being replaced either singly, in pairs, symmetrically, or completely by radicals which are linked through nitrogen or sulphur to the phosphorus atoms in the product. It has been established that the degree of substitution of the chlorine atoms affects both the selectivity and the growth inhibiting or killing ability of the resulting product. As a general proposition it is at the present time believed that the higher the degree of substitution of chlorine atoms the greater the herbicidal activity of the resulting substituted trimer. Furthermore, it has been observed that the more symmetrical the resulting substituent the more herbicidally active it is. Ultimate molecular size of the substituent products also appears to be a factor in herbicidal activity, but molecular size limits have not yet been firmly established.

The herbicidally active compounds of the present invention may be prepared for the most part by simple reaction of the phosphonitrile chloride trimer in an appropriate solvent media with a reactive form of the radical to be substituted. For example, the thiol or sulphur derivatives may be prepared by reacting the appropriate mercaptan, an alkyl thiol, a benzene thiol, o, m or p-toluene thiol, aminobenzene thiol, or chlorobenzene thiol, for example, with $(P_3N_3)Cl_6$ in the presence of an acid acceptor such as pyridine or one of the inorganic bases such as sodium carbonate or trisodium phosphate.

The following non-limiting examples illustrate the preparation of typical nitrogen-containing substituents of the present invention.

Example I

Preparation of

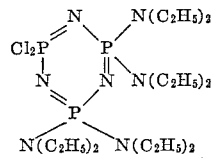

14 grams of phosphonitrilic chloride trimer $(PNCl_2)_3$ was dissolved in 80 cc. of benzene. To this was slowly added over 20 minutes 44 grams of diethylamine dissolved in 50 cc. of benzene. The resulting homogeneous solution became warm during the addition of the diethylamine and was then refluxed 24 hours over a steam bath. The reaction mixture was cooled and filtered from solid diethylamine hydrochloride. An excess of diethylamine (50 cc.) was then added to the filtrate and the reaction was refluxed for another 80 hours, and filtered. The combined vacuum dried residues of Et$_2$NH.HCl was 15.9 grams (melting point 222–223° C.). The filtrate was evaporated on a steam bath to remove any unreacted diethylamine etc., and then placed in an evacuated desiccator until of constant weight. Found 17.5 grams of product corresponding to a yield of 95.2% of $$P_3N_3Cl_2[N(C_2H_5)_2]_4$$

with the following analysis: C, 38.2%; H, 7.9%; N, 19.8%. The product was an amber liquid, insoluble in water, but soluble in benzene, acetone, ether and chloroform.

Example II

Preparation of

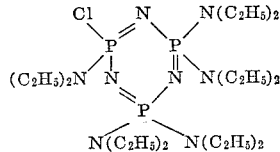

14 grams of phosphonitrilic chloride trimer $(PNCl_2)_3$ was dissolved in 50 cc. of benzene and charged into a high pressure rocker bomb. To this was slowly added over twenty minutes 44 grams of diethylamine dissolved in 20 cc. of benzene. The bomb was then closed, rocked and heated to 150° C.±5° C. for 16½ hours and then cooled. The reaction mixture was filtered. The solid residue washed with benzene and then placed in a vacuum desiccator. Found 21.5 grams of diethylamine hydrochloride M.P. 223–224° C. Filtrate was evaporated on steam bath, then dried to constant weight in a desiccator. Found 10.5 grams corresponding to a 57.1% yield of $P_3N_3Cl.[N(C_2H_5)_2]_5$ with the following analysis: C, 47.45%; H, 9.73%; N, 23.6%; Cl, 5.72%. The product was an amber liquid, insoluble in water, but soluble in benzene, acetone, ether and chloroform.

The activity of the products of Examples I and II as herbicides was determined by planting different weed and undesirable grass seeds in respective flats, and following emergence the plants were treated with the respective products dispersed in a fluent diluent, at rates of 4 and 16 pounds of the product per acre. The tests were repeated on three flats of each seed with the following average results:

| Compound | Rate, lb./acre | Injury Score (0-100)[1] | | | |
|---|---|---|---|---|---|
| | | Crabgrass | Ryegrass | Pigweed | Rape |
| Example I | 4 | 7 | 7 | 57 | 57 |
| | 16 | 23 | 17 | 95 | 95 |
| Example II | 4 | 17 | 17 | 90 | 90 |
| | 16 | 50 | 50 | 97 | 97 |

[1] 0=no effect, 100=death of all test plants.

Attention is drawn to the more drastic conditions required in Example II to prepare the pentasubstituted product. Still more drastic temperatures and a longer time are required to produce the completely substituted phosphonitrile hexadiethylamine trimer.

*Example III*

Preparation of

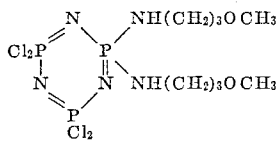

16 grams of phosphonitrilic chloride trimer was dissolved in 200 cc. of ethyl ether. To this was added over a period of 75 minutes 16.4 grams of 3-methoxypropylamine dissolved in 100 cc. of ether while the reaction mixture was being constantly stirred and cooled. After the addition the reaction was further stirred for one hour at room temperature; filtered and the ether evaporated. The oily product was dried overnight over $P_2O_5$ in an evacuated desiccator. Found 19.2 grams of product corresponding to a yield of 92% $P_3N_3Cl_4[NHCH_2CH_2CH_2-O-CH_3]_2$ with the following analysis: C, 21.5%; H, 3.84%; N, 15.5%; Cl, 31.2%. The product was an orange-brown viscous liquid insoluble in water but soluble in ether, benzene, acetone and chloroform.

*Example IV*

Preparation of

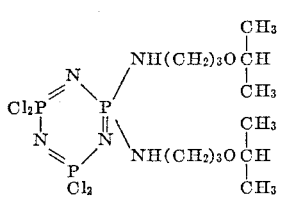

16 grams of phosphonitrilic chloride was dissolved in 250 cc. of ethyl ether. To this was added over a period of 20 minutes 21.6 grams of 3-isopropoxypropylamine in 50 cc. of ether. The reaction mixture was stirred overnight. The precipitate of amine HCl was filtered off and the ether solution was washed with water and then the ether layer was dried with $MgSO_4$, filtered, and the ether evaporated. The resulting product was a water-white somewhat viscous liquid which was dried over $P_2O_5$ in an evacuated desiccator. Found 20 grams of product corresponding to a yield of 85.5% of $$P_3N_3Cl_4[NH(CH_2)_3O-CH.(CH_3)_2]_2$$

with the following analysis: C, 29.63%; H, 6.16%; N, 14.5%; Cl, 27.80%. The product was insoluble in water but soluble in ether, benzene, acetone and chloroform.

*Example V*

Preparation of

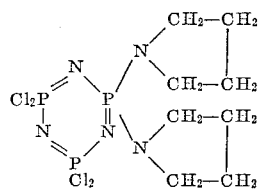

16 grams of phosphonitrilic chloride was dissolved in 250 cc. of ethyl ether. To this was added over a period of 20 minutes 13.1 grams of pyrrolidine dissolved in 50 cc. of ether. The reaction mixture was stirred overnight and the reaction was filtered from the solid pyrrolidine hydrochloride formed. The ether solution was washed with water and dried over $MgSO_4$ and filtered. The ether was evaporated and the resulting thick viscous liquid dried in a vacuum desiccator. Found 19.2 grams of product corresponding to a yield of 78.2% of $P_3N_3Cl_4[N.(CH_2)_4]_2$ with the following analysis: C, 23.6%; H, 4.04%; N, 16.5%; Cl, 34.6%. The tan viscous liquid was insoluble in water but soluble in ether, benzene, acetone and chloroform.

*Example VI*

Preparation of

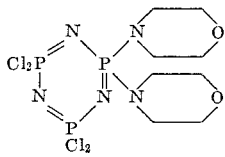

16 grams of phosphonitrilic chloride trimer was dissolved in 200 cc. of ethyl ether. To this was added over a 10 minute period 16 grams of morpholine at room temperature; the reaction develops little heat and no external cooling is required. After the addition the reaction was further stirred for 2 hours, then filtered and the ether evaporated. The yellow-white solid product was dissolved in a small portion of hot benzene, cooled to room temperature and petroleum ether added to four times the volume of the benzene used. The solution was placed in a freezer to crystallize overnight. Found 10.5 grams of white crystal product corresponding to a yield of 51.2%

$$P_3N_3Cl_4[N(CH_2)_4O]_2$$

with the following analysis: C, 21.5%; H, 3.8%; N, 15.6%; Cl, 31.0%. The product was insoluble in water but soluble in ether, benzene, acetone and chloroform, and had a melting point of 102–105° C.

In carrying out the process of the present invention to inhibit the postemergence growth of grasses and weeds, the herbicidally active compounds hereof are applied to the plants in very dilute form, either as liquid sprays, i.e. solutions or oil in water emulsions, or as solid dusts. By proper selection and proportioning of various adjuvant agents either liquid or solid formulations can easily be prepared by known methods so as to better adapt the herbicidally active compounds to achieve their desired results, and to enable application by conventional devices for treating plant foliage.

Solid formulations, frequently referred to as dusts, will contain in addition to the active ingredient fluent diluents or extenders, and possibly dispersing agents to prevent local high concentration. Suitable solid diluents are those which render the compositions permanently dry and free-flowing. For this purpose natural clays such as china clay, the bentonites, and the attapulgites, as well as other minerals in their natural state such as talc, quartz, diatomaceous earth, fuller's earth, rock phosphate or suphur may be employed. Also chemically modified minerals such as acid washed bentonite, precipitated calcium carbonate or colloidal silica may be used. These diluents will represent a substantial portion of the finished herbicidal compositions, often as much as 80 to 98% by weight of the entire formulation as it is applied to the plant.

Many formulations are benefitted by the incorporation of organic solvents for the active components, with or without the presence of miscible dispersing agents such as ketones, benzene, acetone, kerosene and chlorinated hydrocarbons.

The solid or liquid formulations are applied to the plants by mechanical equipment involving spraying or spreading the formulations onto the plant foliage. For this purpose readily flowable compositions are required, whether they be liquid or solid, and a critical aspect of the method of the present invention is the presence of a fluent diluent or carrier, without which the optimum herbicidal effect of the compounds of the present invention cannot be achieved.

I claim:
1. Phosphonitrile chloride-bis-methoxy propylamine of the formula

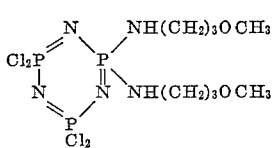

2. Phosphonitrile chloride-bis-isopropoxy propylamine of the formula

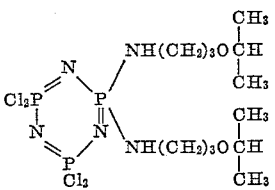

3. Phosphonitrile chloride-bis-pyrrolidine of the formula

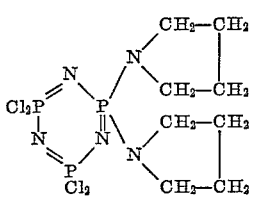

4. Phosphonitrile chloride-bis-morpholine of the formula

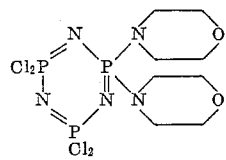

5. Phosphonitrile chloride-bis-ethoxy propylamine of the formula

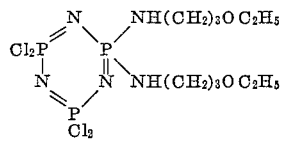

References Cited by the Examiner
UNITED STATES PATENTS

| | | | |
|---|---|---|---|
| 2,192,921 | 3/1940 | Lipkin | 260—606.5 |
| 2,833,635 | 5/1958 | Hill et al. | 252—386 |
| 2,941,001 | 6/1960 | Burg et al. | 260—551 |
| 2,966,487 | 12/1960 | Jiu et al. | 260—247.5 |
| 2,978,310 | 4/1961 | Daams et al. | 71—2.3 |
| 2,981,619 | 4/1961 | Josephs | 71—2.3 |

FOREIGN PATENTS

| | | |
|---|---|---|
| 900,814 | 1/1954 | Germany. |
| 1,050,997 | 2/1959 | Germany. |
| 830,800 | 3/1960 | Great Britain. |

OTHER REFERENCES

Audrieth: Records of Chemical Progress, vol. 20: (No. 2); pages 59 and 63–65, June, 1959.

Bode et al.: Deutsche Chemische Gesellschaft (Berichte), vol. 81: (No. 6); pages 548, 550–552 (1948).

Goehring et al.: Zeitschrift fur Anorganische and Allgemeine Chemie, vol. 302: pages 104–108, 110–119 (1959).

Schenck: Deutsche Chemische Gesellschaft (Berichte), vol. 60B: pages 160–161 (1927).

Ray et al.: Industry & Chemistry, January 10, 1959; pages 53–54.

Shaw: Industry & Chemistry, January 10, 1959; page 54.

Yokoyama: "Nippon Kagaku Zasshi," volume 81, pp. 1453-7 (1960).

WALTER A. MODANCE, *Primary Examiner.*

IRVING MARCUS, D. V. McCUTCHEN,
J. W. MOLASKY, R. T. BOND,

*Assistant Examiners.*